(No Model.)
C. A. McELROY.
HARROW ATTACHMENT.
No. 294,652. Patented Mar. 4, 1884.
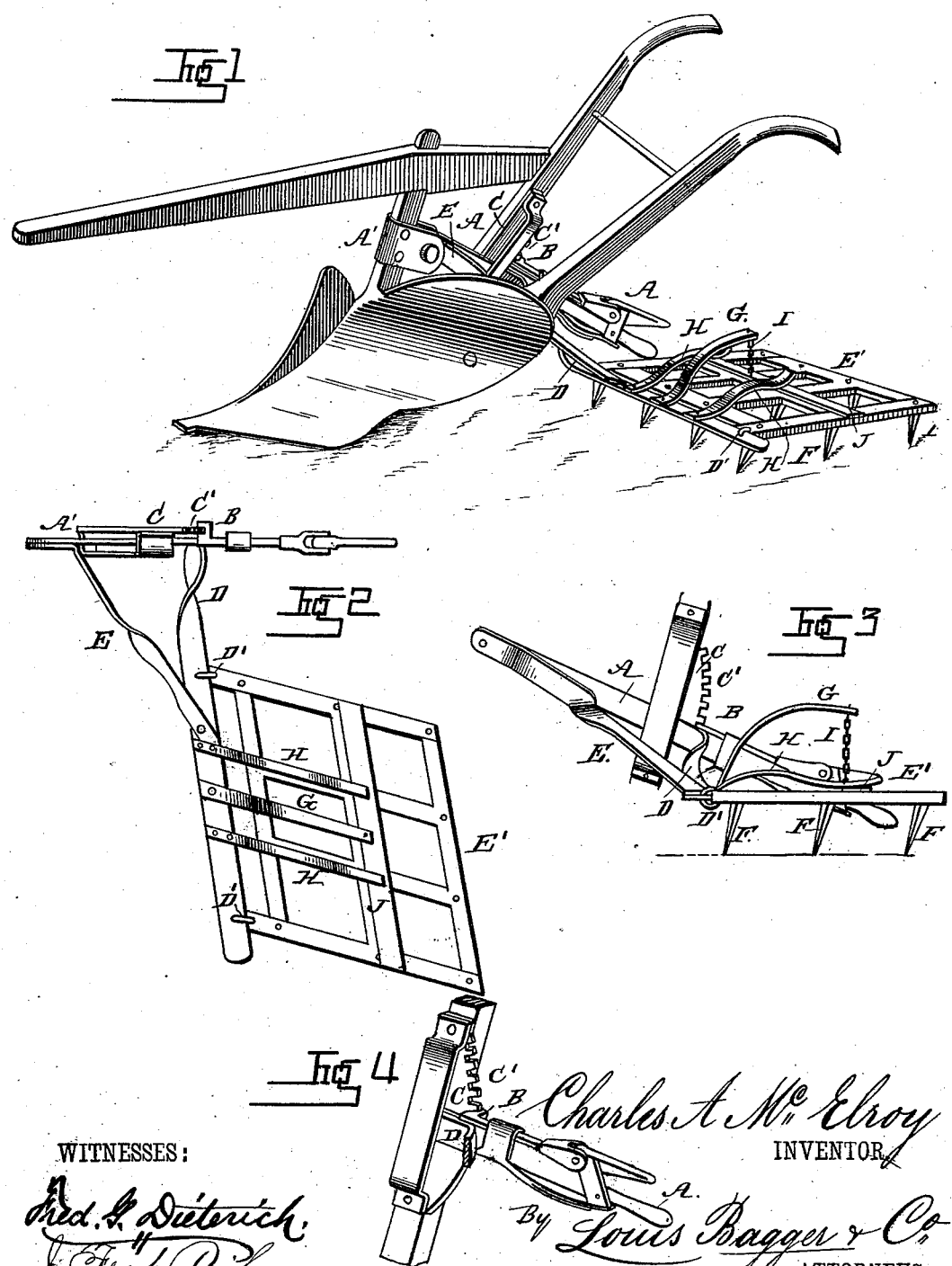
WITNESSES:
Fred. G. Dieterich
J. Fred. Reily
Charles A. McElroy
INVENTOR
By Louis Bagger & Co.
ATTORNEYS.

UNITED STATES PATENT OFFICE.

CHARLES AUSTEN McELROY, OF DELAWARE, OHIO.

HARROW ATTACHMENT.

SPECIFICATION forming part of Letters Patent No. 294,652, dated March 4, 1884.

Application filed July 26, 1883. (No model.)

*To all whom it may concern:*

Be it known that I, CHARLES A. McELROY, a citizen of the United States, and a resident of Delaware, in the county of Delaware and State of Ohio, have invented certain new and useful Improvements in Harrow Attachments; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved harrow attachment attached to a plow of ordinary construction. Fig. 2 is a top view of the attachment detached from the plow. Fig. 3 is a side view of the same; and Fig. 4 is a perspective detail view of the spring-catch, forming a part of my invention.

Similar letters of reference indicate corresponding parts in all the figures.

My invention has relation to harrow attachments adapted to be attached to any agricultural implement—as a plow, sulky-plow, gang-plow, cultivator, or seeding-machine—with which a harrow is adapted to be used; and it consists in the improved construction and combination of parts of the same, as will be hereinafter more fully described and claimed.

In the accompanying drawings, A represents the lever of my improved harrow attachment, the forward end of which is pivoted between the ends of a keeper, A', which is adapted to be secured upon the standard of a plow, or any one of the shovel-standards of a cultivator.

Upon the outer end of the lever A is a spring-catch, B, adapted to engage with the teeth of a segmental rack, C', forming part of a plate, C, which is bolted to the inside of the plow-handle, which is in a line with the plow-standard.

To the lever A is secured an arm, D, which extends at right angles to the lever, and is connected to the forward part of the lever by a brace, E.

To the arm D is secured, by means of links or rings D', the harrow E', which is made preferably in the shape of a rhomboid, and is provided with teeth F, which may be either fixed or removable, as desired.

Upon the arm D are secured arms G and H H, the free end of the arm G, which is in the center, being curved upward, and being connected to the center of the harrow by means of a chain, I, by which the harrow may be raised or lowered, as desired. The outer ends of the arms H H press upon a chafing-plate, J, which extends across the center of the harrow, the tension or pressure of the said arms serving to hold the harrow down to its work and prevent it from swinging too far upward, as would otherwise be the case.

In operating my improved harrow attachment by means of the pivoted lever A, held by the spring-catch B, the operator can raise or lower the harrow at will to regulate the depth which the harrow-teeth enter the ground, while by means of the chain I the angle at which the harrow works with relation to the arm D can be increased or lessened at the will of the operator. The arms H H, as previously described, serve to hold the harrow down to its work and prevent it from swinging too far upward.

From the foregoing description, taken in connection with the accompanying drawings, the construction and operation of my improved harrow attachment will readily be understood without requiring further explanation. It will be seen that by employing my improved harrow attachment with a plow or cultivator the ground is harrowed at the same time that it is plowed, the ground being in a better condition for harrowing directly after plowing than when allowed to remain until the clods and lumps become hardened by the sun. The use of this attachment prevents the ground from being tramped upon by a team when harrowing, and also saves the time and labor of one man and team harrowing the ground after the plowing is done.

Having thus described my invention, I claim and desire to secure by Letters Patent of the United States—

1. The combination of the pivoted lever A, provided with a spring-catch, B, arm D, secured at right angles to the lever A, and provided with an arm, G, and spring-arms H H, harrow E', movably secured to the arm D, and provided with a chafing-plate, J, and chain I, as and for the purpose shown and set forth.

2. The combination of the arm D, provided with an arm, G, and spring-arms H H, harrow E', movably secured to the arm D, and provided with a chafing-plate, J, chain I, and means for connecting the arm D to a plow or cultivator, as and for the purpose shown and set forth.

3. The combination of a plow or cultivator provided with a plate, C, having a segmental rack, C', upon its outer edge, and having a keeper, A', secured to the plow-standard or one of the shovel-standards, lever A, pivoted at one end between the ends of the keeper A', and provided with a spring-catch, B, adapted to engage with the segmental rack C', arm D, secured at right angles to the lever A, and provided with an arm, G, and spring-arms H H, harrow E', movably secured to the arm D, and provided with a chafing-plate, J, and chain I, all constructed, combined, and arranged as and for the purpose shown and set forth.

In testimony that I claim the foregoing as my own I have hereunto affixed my signature in presence of two witnesses.

CHARLES AUSTEN McELROY.

Witnesses:
LEOPOLD HISS,
OLIVER E. FOSTER.